P. H. EDWARDS.
TRAP NEST.
APPLICATION FILED NOV. 20, 1908.
977,606.
Patented Dec. 6, 1910.
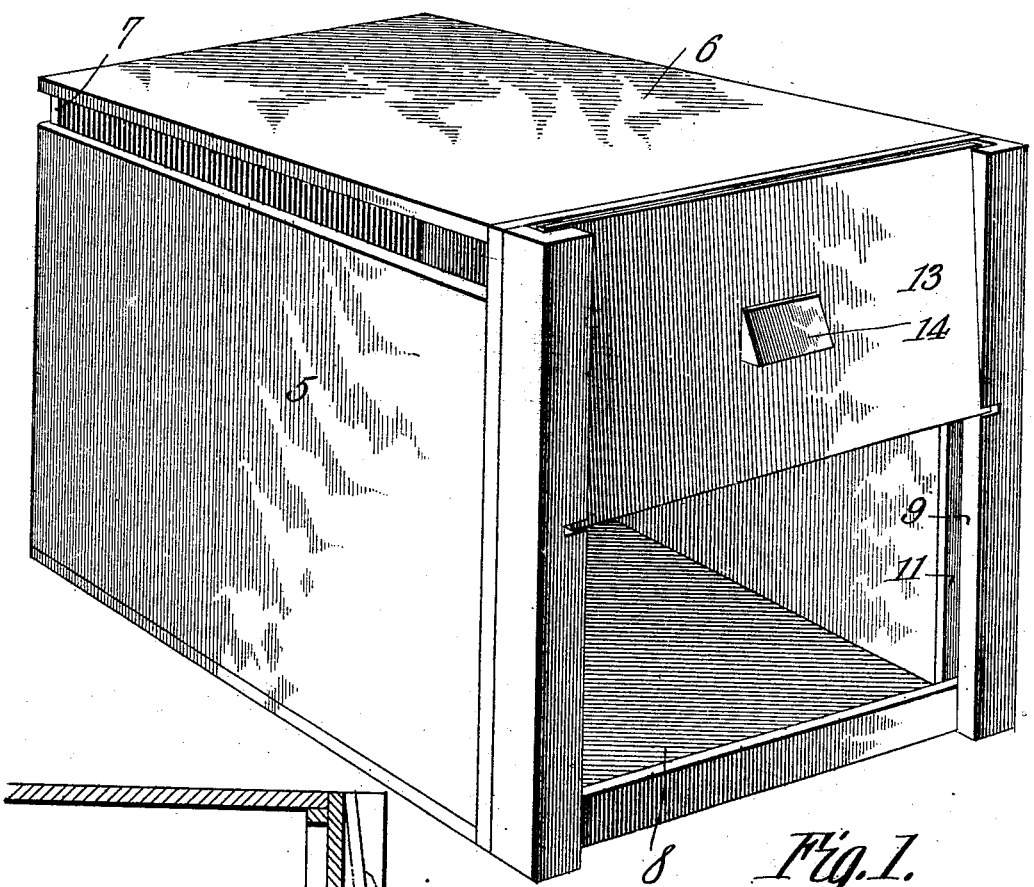
Fig. 1.
Fig. 2.
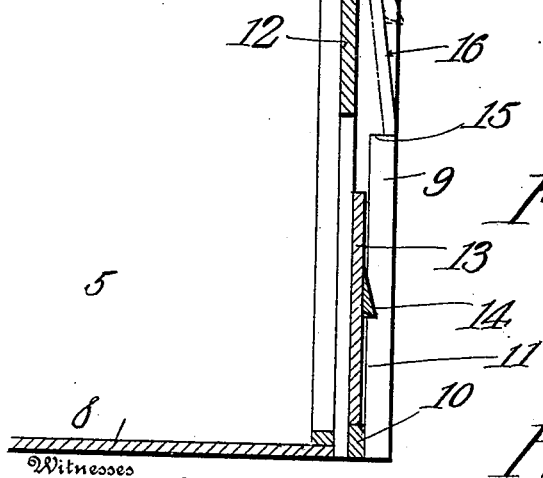
Witnesses
Inventor
Philip H. Edwards
By C. A. Snow & Co.
Attorneys

UNITED STATES PATENT OFFICE.

PHILIP HENRY EDWARDS, OF COLORADO SPRINGS, COLORADO.

TRAP-NEST.

977,606.  Specification of Letters Patent.  Patented Dec. 6, 1910.

Application filed November 20, 1908. Serial No. 463,654.

*To all whom it may concern:*

Be it known that I, PHILIP H. EDWARDS, a citizen of the United States, residing at Colorado Springs, in the county of El Paso and State of Colorado, have invented a new and useful Trap-Nest, of which the following is a specification.

It is the primary object of the present invention to provide a trap nest in which the door of the nest will be automatically closed by the entrance of a hen into the nest and to accomplish this result without the provision of tilting platforms or levers.

In the present invention, the door of the nest is mounted to slide freely in guides and drop by gravity to close the door opening of the nest and is supported normally in raised position upon shoulders associated with its guides, in such a position that a hen or other fowl entering the nest will disengage the door from the shoulders and permit it to drop to position to close the door opening.

In the accompanying drawings, Figure 1 is a perspective view of a trap nest embodying the invention, and Fig. 2 is a vertical longitudinal sectional view through the forward end of the nest showing in dotted lines the normal position of the trap door of the nest and in full lines its released position.

As shown in the drawings, the nest is comprised of a casing the side walls of which are indicated by the numeral 5, the top by the numeral 6, the rear end wall by the numeral 7, and the bottom by the numeral 8. The front end of the casing, which is preferably rectangular, is open as is clearly shown in Fig. 1 of the drawings. Mounted at each side of the open end of the casing is a guide stile 9 and these stiles are connected at their lower ends by means of a sill 10 which is secured at its ends in guide grooves 11 formed in the opposing sides of the said stiles 9. At their upper ends, the stiles are connected by means of a fixed wall section 12 which aids in closing the doorway when the door of the nest is dropped to closed position.

As above stated, the stiles 9 are provided with guide grooves 11 and working freely at its vertical edges in these grooves is the door 13 of the nest, said door being provided upon its outer face with a handle or finger piece 14 by means of which it may be raised to the dotted line position shown in Fig. 2 and shown in full lines in Fig. 1. When the door is raised as stated to expose the door opening, the lower edge of the door at the end thereof seats upon shoulders 15 formed one upon each of the stiles 9, the grooves 11 of the stiles being gradually widened from the upper ends of the stiles to the point at which the shoulders are formed as indicated at 16 so as to permit of the door assuming an inclined position when its lower edge is in engagement with the shoulders. When the door is in raised position as above described, the door opening is exposed to permit the entrance of a fowl into the nest casing, and as a fowl enters the casing through the doorway, the lower edge of the door is engaged and the door is lifted bodily from engagement with the shoulders 15 and is permitted to drop by gravity to the position shown in full lines in Fig. 2 of the drawings, so as to close or substantially close the door opening and prevent the fowl leaving the nest until the door is again raised to open position by some one attending to the nest.

As will be observed from Fig. 2 of the drawings, the lower edge of the wall section 12 is located in a plane above that occupied by the upper edge of the door 15 when the said door is in lowered position, so that a space is left between the said edges of the two members for the purpose of ventilation and also to permit of inspection of the interior of the nest without the necessity of raising the door.

It will be further understood that by providing a door arranged to drop by gravity but normally supported in open position, means has been provided whereby a fowl may be trapped without the necessity of providing in or upon the floor of the nest movable platforms or operating levers for moving the door to closed position.

What is claimed is:—

1. In a trap nest, a casing including a bottom, a rear, a top, and side walls, and a front wall, said front wall extending from the plane of the top wall to about the middle of the front of the casing, the lower portion of the front of the casing being open, stiles one at each side of the said front, said stiles being formed each with a guide groove gradually widened from the upper end to a point approximately coincident with the lower edge of the front wall whereby to afford a shoulder between the upper and lower ends of the groove, and a door freely slidable at its edges in the groove and adapted to be supported in an inclined position in advance of the front wall with its lower edge resting upon the shoulder in the grooves whereby to expose the open portion of the front of the casing and being further adapted to be engaged by a fowl entering through the open portion of the front and to have its lower edge moved from engagement with the shoulder to allow it to drop to position to close the said open portion of the front.

2. In a trap nest, a casing including a bottom, a rear, a top, and side walls, and a front wall, said front wall extending from the plane of the top wall to about the middle of the front of the casing, the lower portion of the front of the casing being open, stiles one at each side of the said front, said stiles being formed each with a guide groove gradually widened from the upper end to a point approximately coincident with the lower edge of the front wall whereby to afford a shoulder between the upper and lower ends of the groove, and a door freely slidable at its edges in the groove and adapted to be supported in an inclined position in advance of the front wall with its lower edge resting upon the shoulder in the grooves whereby to expose the open portion of the front of the casing and being further adapted to be engaged by a fowl entering through the open portion of the front and to have its lower edge moved from engagement with the shoulder to allow it to drop to position to close the said open portion of the front, the said stiles being formed through their forward faces with openings in a plane with the shoulders.

In testimony that I claim the foregoing as my own, I have hereto affixed my signature in the presence of two witnesses.

PHILIP HENRY EDWARDS.

Witnesses:
M. A. SKINNER,
GEO. H. SINTON.